United States Patent [19]
Hildebrand

[11] 3,889,420
[45] June 17, 1975

[54] VEHICLE DOOR OPERATOR

[76] Inventor: Clinton L. Hildebrand, 1139 N. Baltimore, Derby, Kans. 67037

[22] Filed: Dec. 19, 1973

[21] Appl. No.: 426,350

[52] U.S. Cl. .................................. 49/302; 49/344
[51] Int. Cl. ............................................. E05f 11/22
[58] Field of Search ............. 49/279, 344, 346, 356, 49/302, 339

[56] References Cited
UNITED STATES PATENTS

| | | | |
|---|---|---|---|
| 1,640,989 | 8/1927 | Hennicke | 49/344 |
| 1,704,476 | 3/1929 | Hennicke | 49/344 X |
| 2,563,248 | 8/1951 | Kotzin | 49/302 |
| 2,787,461 | 4/1957 | Steele | 49/302 |

Primary Examiner—Kenneth Downey
Attorney, Agent, or Firm—John N. Randolph

[57] ABSTRACT

A door operating device by means of which the operator of a vehicle, such as a bus, from a seat on the left hand side of the vehicle, can open and close a passenger access door located on the right hand side thereof. A single movement of a lever by the vehicle driver initially unlatches the door and thereafter swings the door to an open position. Movement of the control lever in the opposite direction returns the door to a closed and latched position.

6 Claims, 6 Drawing Figures

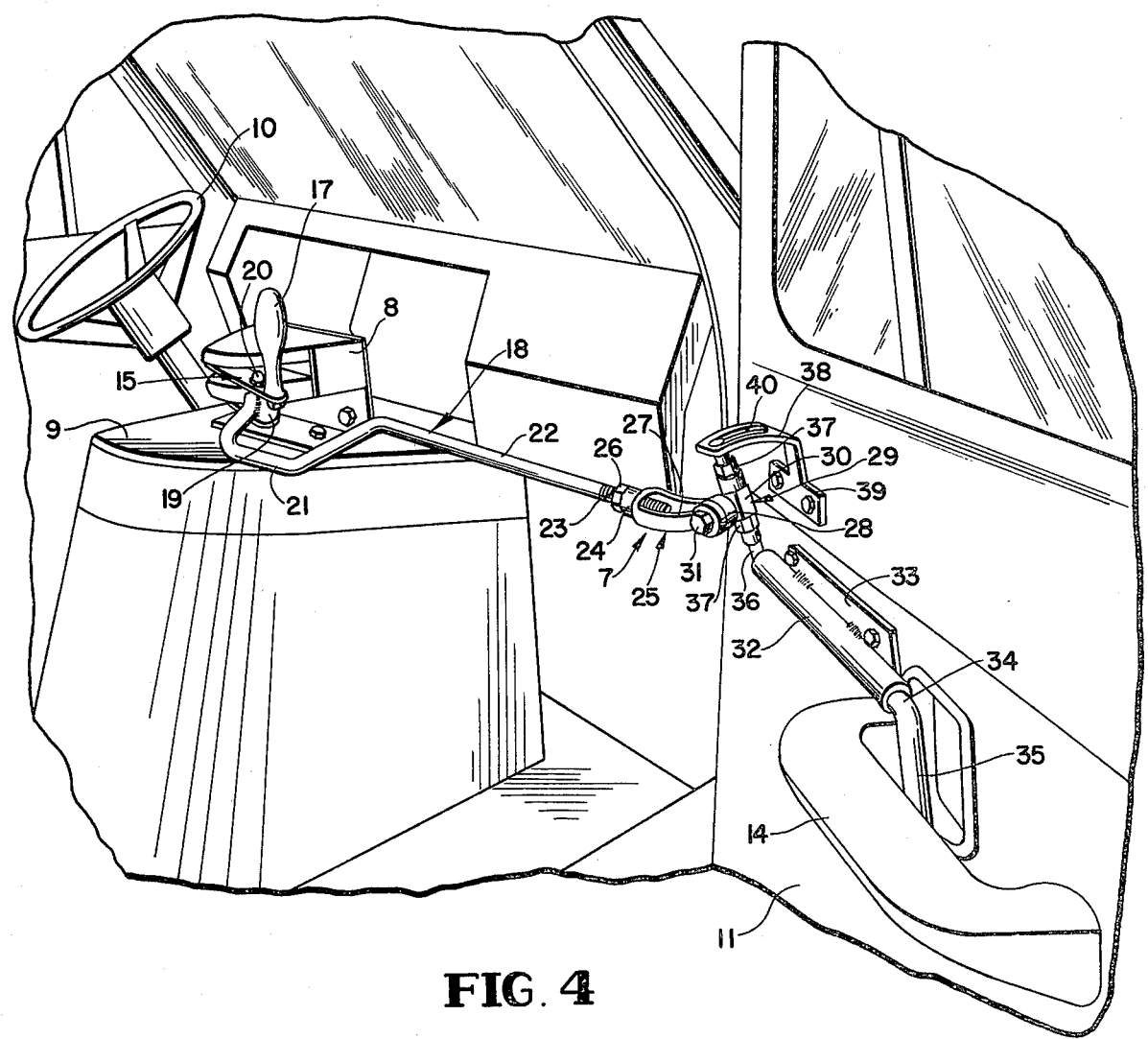
FIG. 4
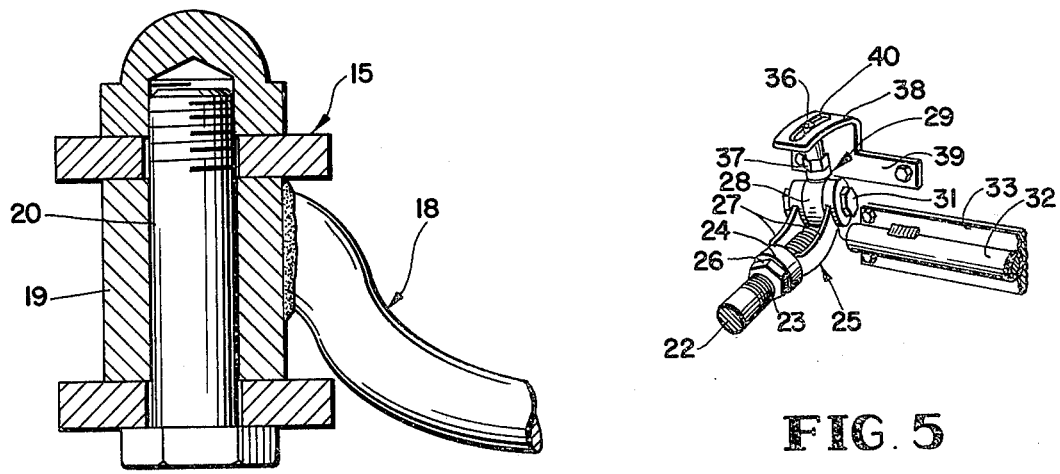
FIG. 6
FIG. 5

VEHICLE DOOR OPERATOR

SUMMARY

It is a primary object of the present invention to provide a vehicle door operator by means to which the driver of a bus, such as a school bus, can unlatch and then open the access door on the right of the bus while seated in the driver's seat at the left of the bus, to thereby provide a remote actuator for a bus door which will not allow the door to open due to vibration or impact as frequently occurs with remote operators now in use.

Another object of the invention is to provide a door operator of extremely simple construction which functions in conjunction with the conventional door latch actuator for initially moving said actuator to a position for unlatching the door and for thereafter swinging the door to an open position, when a lever disposed remote from the door and adjacent to the driver's seat is actuated by the driver of the bus.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 4 is a perspective view of substantially the same parts as seen in FIG. 1, and showing the position of the parts of the operator after the door has been moved thereby to an open position;

FIG. 5 is a fragmentary perspective view of a portion of the door operator, and

FIG. 6 is an enlarged fragmentary view, partly in section and partly in elevation, of another part of the vehicle door operator.

DESCRIPTION OF THE PREFERRED EMBODIMENT

Figure 2:
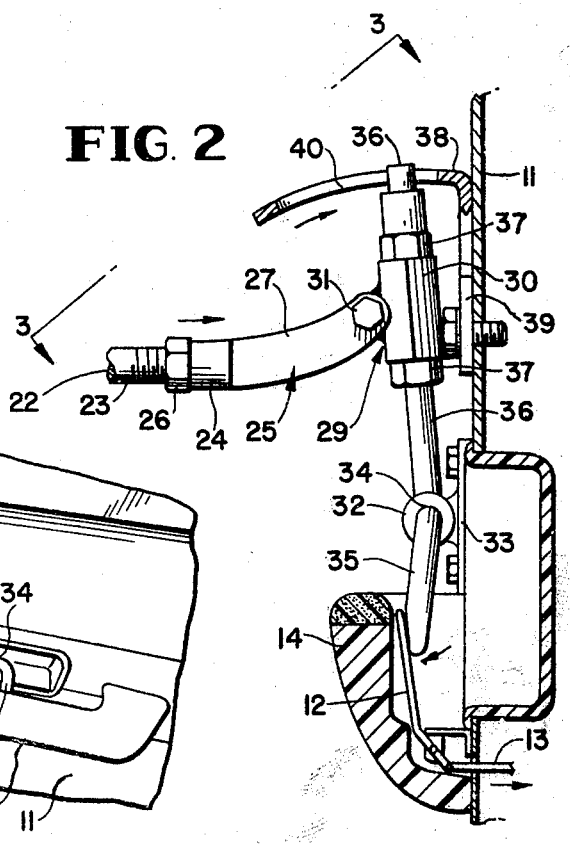
FIG. 2 is a fragmentary vertical sectional view of a portion of the vehicle door and showing, primarily in elevation and partly in section, a portion of the door operator attached thereto.
Figure 3:
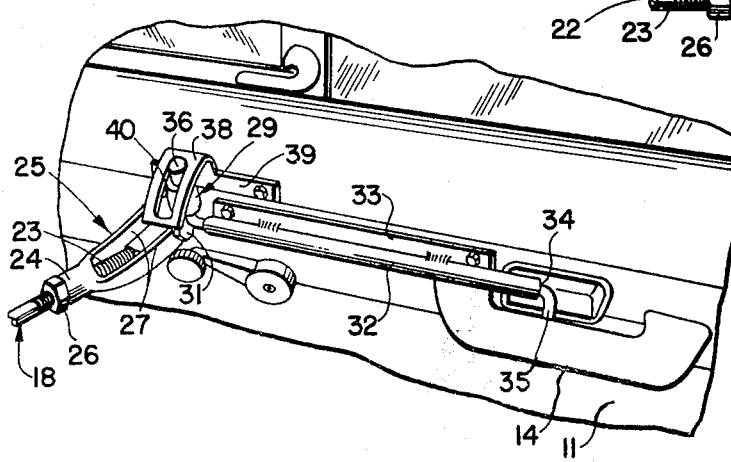
FIG. 3 is a fragmentary perspective view on a reduced scale, of the door portion and door operator portion illustrated in FIG. 2 and taken along the line 3—3 of FIG. 2.

Referring more specifically to the drawings, the vehicle door operator in its entirety and comprising the invention is designated generally 7 and includes a bracket 8 which is secured preferably to a substantially horizontal elevated supporting surface 9 of a conventional bus, such as a school bus, and which is located between the steering wheel 10 of the bus, which is disposed on the left hand side thereof, and the access door 11 which is disposed on the right hand side of the bus, and by means of which the passengers normally enter and leave the bus. The door 11 is normally held in a closed position in a conventional manner by a latch, not shown, which is unlatched by the lever 12 through linkage, a part of which is shown at 13, which connects the lever 12 to said latch. The lever 12 is disposed within a recess of an armrest 14 and is swung inwardly of the door 11, as seen in FIG. 2, to a position for unlatching the door.

A lever 15 of the door operator is swingably attached, adjacent one end thereof, by a pivot element 16 to the bracket 8 for swinging movement about a substantially vertical axis. A knob or handle 17 is connected to and preferably rises from the other end of the lever 15 and is gripped by the vehicle operator, while seated behind the steering wheel 10, for swinging the lever 15 from its position of FIG. 1 to or beyond its position of FIG. 4.

A rigid rod 18 has a sleeve 19 at one end thereof which is disposed with its axis substantially normal to the rod 18. The sleeve 19 swivelly engages a pivot element 20, FIG. 6, which is attached to the lever 15 and is disposed with its axis parallel to the axis of the pivot 16 and remote therefrom. The rod 18 is preferably provided with an offset portion 21, located adjacent the sleeve 19, for clearing the part of the bracket 8 to which the lever 15 is connected, and an opposite straight end 22 having a threaded terminal 23 which threadedly engages in the collar 24 of a yoke 25. A nut 26 threadedly engages the portion 23 and bears against the collar 24 to retain the yoke 25 in an adjusted position on the rod 18.

The yoke 25 has corresponding curved arms 27 the terminals of which straddle the ends of a sleeve or collar 28, FIG. 5, which forms a part of a joint 29 which additionally includes a sleeve 30 to which the sleeve or collar 28 is secured. The bore of the sleeve 30 is disposed crosswise of the bore of the collar 28. A pivot fastening 31 extends through the collar 28 and the terminals of the arms 27 for swingably attaching the yoke 25 and the end of the rod 18, connected thereto, to the joint 29.

A bearing sleeve 32 has a mounting plate 33 which is secured to the inner side of the door 11. The sleeve 32 provides a journal for a shaft 34 having terminal portions extending beyond the ends of the bearing 32. One of said terminal portions 35 is turned downwardly to form a crank which extends into the recess of the armrest 14 and which is disposed between the actuating lever 12 and the inner face of the door 11, as seen in FIG. 2. The other terminal 36 of the shaft 34 extends upwardly beyond the other end of the bearing 32 to form a crank on which the sleeve 30 is swivelly mounted between stops formed by nuts 37.

A bar 38 extends inwardly from the door 11 and is supported by a bracket 39 secured to said door. The bar 38 has an elongated slot 40 in which the upper end of the crank 36 is disposed to move and by means of which said crank end is confined and limited in its oscillating movement. The bar 38 is longitudinally bowed to substantially conform to the arc in which the upper end of the crank 36 moves.

Figure 1:
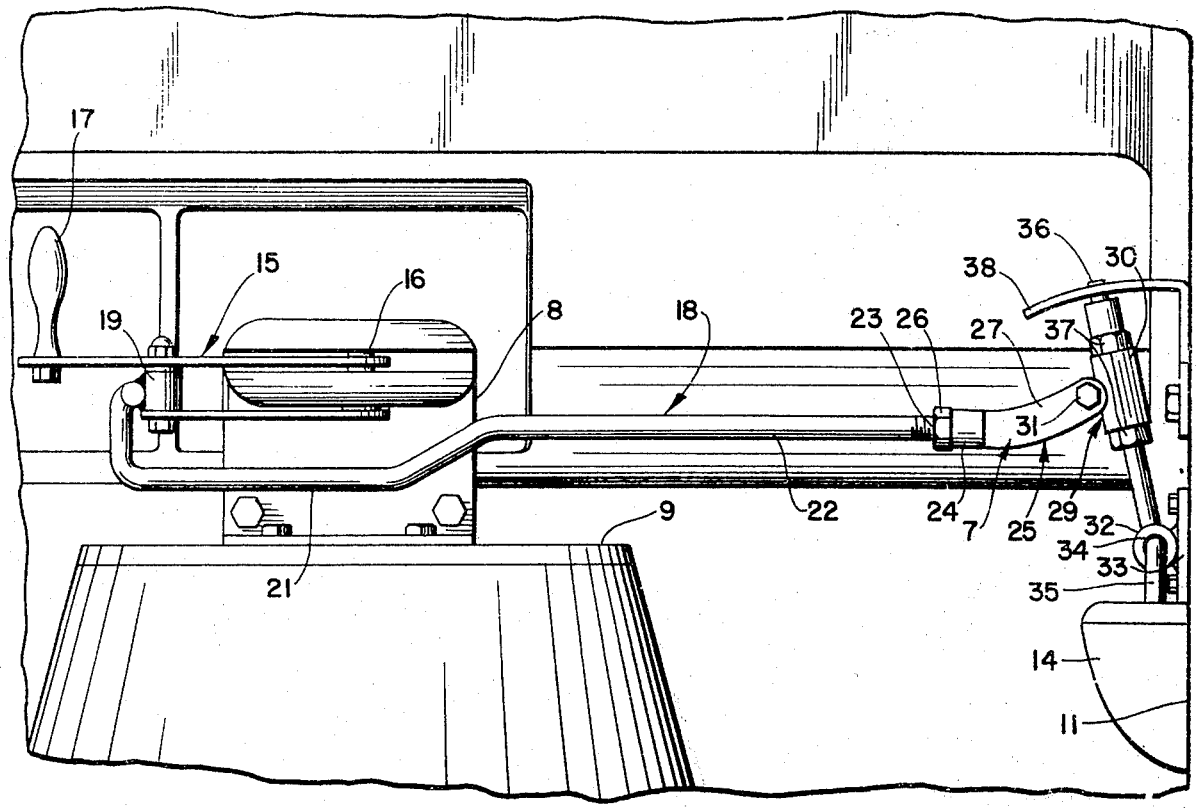
FIG. 1 is a fragmentary transverse view in elevation of a portion of the interior of a bus and showing the vehicle door operator applied thereto.

With the door 11 in a closed and latched position, the parts of the door operator 7 will be disposed in their positions of FIG. 1. A vehicle operator from his seat, not shown, behind the steering wheel 10, can conveniently grasp the handle or knob 17 to swing the lever 15 from the left to the rear and then forwardly and to the right from its position of FIG. 1 to its position of FIG. 4. The initial movement of the lever 15 from its position of FIG. 1 will exert a thrust on the rod 18 and yoke 25 in a direction from left to right of FIG. 1 for swinging the crank 36 clockwise and toward the door 11 and to cause the shaft 34 and crank 35 likewise to swing clockwise. This clockwise swinging movement of the crank 35 causes it to engage and swing the lever 12 counterclockwise and away from the door 11 for moving the latch, not shown, to a position for unlatching the door 11. Thereafter, a further swinging movement of the lever 15 in the same direction will cause the thrust exerted by the rod 18 and the yoke 25 on the fitting 29 and crank 36 to swing the door 11 outwardly and to its open position of FIG. 4. The pivot 31 allows the yoke 35 and arm 18 to swing relative to the fitting 29 and crank 36 as said crank is swung from its position of FIG. 1 to its position of FIG. 2, and the swivel connection of the sleeve 30 to the crank 36 allows the yoke 25 and rod 18 to swing with the fitting 29 relative to the crank 36 as the door 11 swings to an open position, and thereafter back to a closed position.

To return the door 11 to a closed position, the vehicle operator merely grasps the handle 17 and pulls it toward him from its position of FIG. 4 back to its position of FIG. 1. The lever 15 in swinging with the handle 17 exerts a pull on the rod 18 and the yoke 25 for initially swinging the crank 36 counterclockwise from its position of FIG. 2 to its position of FIG. 1, for causing the shaft 34 and crank 35 to swing counterclockwise, thereby swinging the crank 35 out of engagement with the lever 12 so that the latch can return to a projected position. Accordingly, as the door 11 reaches its fully closed position, it will be latched in a conventional manner.

Various modifications and changes are contemplated and may be resorted to, without departing from the function or scope of the invention.

I claim as my invention:

1. A vehicle door operator comprising a lever, means pivotally mounting said lever adjacent one end thereof for swinging movement in a direction crosswise of a vehicle, a rigid rod having one end pivotally connected to said lever at a point spaced from said pivot means, a bearing sleeve mounted on the inner side and crosswise of a passenger access door of the vehicle, a shaft journaled in said sleeve, said shaft having terminal portions forming cranks disposed beyond the ends of said bearing and between the side edges of the door, a first one of said cranks extending downwardly from the shaft and being disposed to engage a door latch actuating lever of said door, the other second crank extending upwardly from the shaft, a guide secured to the door and having a slot in which a part of the second crank is swingably confined, and means swingably connecting the other end of said rod to said second crank whereby when said lever is swung about its pivot means in a direction toward the door said rod will exert an initial thrust on the second crank for causing the first crank to engage and move the latch operating lever to a position for unlatching the door after which the thrust on said rod will swing the door to an open position.

2. A vehicle door operator as in claim 1, means swingably connecting the rod to the second crank including a joint swivelly mounted on the second crank and to which the rod is pivotally connected about an axis disposed at a right angle to the axis of the second crank.

3. A vehicle door operator as in claim 2, said other rod end comprising a yoke.

4. A vehicle door operator as in claim 3, and means for extending or retracting the yoke.

5. A vehicle door operator as in claim 2, said joint comprising a sleeve engaging the second crank and a collar secured to the sleeve and disposed crosswise thereof.

6. A vehicle door operator as in claim 1, and a handle connected to and extending upwardly from the lever near the other free end thereof.

* * * * *